(12) United States Patent
Alcantara et al.

(10) Patent No.: US 11,721,187 B2
(45) Date of Patent: Aug. 8, 2023

(54) METHOD AND SYSTEM FOR DISPLAYING VIDEO STREAMS

(71) Applicant: Avigilon Corporation, Vancouver (CA)

(72) Inventors: Tulio de Souza Alcantara, Vancouver (CA); Roger David Donaldson, Vancouver (CA); David Flanagan, Vancouver (CA); Zachary Lang, Vancouver (CA); Quan Pan, Port Coquitlam (CA); Brenna Randlett, Vancouver (CA); Brady James Schnell, Burnaby (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/675,958

(22) Filed: Nov. 6, 2019

(65) Prior Publication Data

US 2020/0145620 A1 May 7, 2020

Related U.S. Application Data

(60) Provisional application No. 62/829,894, filed on Apr. 5, 2019, provisional application No. 62/756,418, filed on Nov. 6, 2018.

(51) Int. Cl.
*G08B 13/196* (2006.01)
*H04N 7/18* (2006.01)
(Continued)

(52) U.S. Cl.
CPC ..... *G08B 13/19693* (2013.01); *G06F 3/0482* (2013.01); *G06F 3/04817* (2013.01); *G06V 20/35* (2022.01); *G06V 20/40* (2022.01); *G06V 20/41* (2022.01); *G06V 20/52* (2022.01); *G08B 13/19682* (2013.01); *G08B 13/19691* (2013.01);
(Continued)

(58) Field of Classification Search
CPC ................. G08B 13/19693; G08B 13/19691
See application file for complete search history.

(56) References Cited

U.S. PATENT DOCUMENTS 5,258,837 A * 11/1993 Gormley .......... G08B 13/19645
348/441
7,382,244 B1 * 6/2008 Donovan ................ H04L 41/22
340/506
(Continued)

FOREIGN PATENT DOCUMENTS

EP          2046040 A2    4/2009
JP        2014192713 A   10/2010

OTHER PUBLICATIONS

WIPO, Machine translation of JP 2014-192713 A (Jan. 2021) (Year: 2021).*
(Continued)

*Primary Examiner* — David N Werner
(74) *Attorney, Agent, or Firm* — Perry + Currier, Inc.

(57) ABSTRACT

A method for displaying video streams involves detecting multiple video events, and displaying multiple video streams on a display. Display windows for displayed video streams define an ordered sequence of display windows. When a new event is detected, the display of one or more of the video streams is shifted to respective next one or more display windows in an ordered sequence of display windows.

24 Claims, 13 Drawing Sheets

(51) Int. Cl.
*H04N 5/268* (2006.01)
*H04N 21/47* (2011.01)
*H04N 21/431* (2011.01)
*G06F 3/04817* (2022.01)
*G06F 3/0482* (2013.01)
*G06V 20/00* (2022.01)
*G06V 20/40* (2022.01)
*G06V 20/52* (2022.01)
*G06T 7/20* (2017.01)

(52) U.S. Cl.
CPC .............. *H04N 5/268* (2013.01); *H04N 7/181* (2013.01); *H04N 21/4316* (2013.01); *H04N 21/47* (2013.01); *G06F 2203/04803* (2013.01); *G06F 2203/04806* (2013.01); *G06T 7/20* (2013.01); *G06T 2207/10016* (2013.01); *G06T 2207/30232* (2013.01); *G06V 20/44* (2022.01); *G08B 13/19602* (2013.01)

(56) References Cited

U.S. PATENT DOCUMENTS

| | | | |
|---|---|---|---|
| 7,679,507 B2 | 3/2010 | Babich et al. | |
| 8,823,508 B2 | 9/2014 | Thiruvengada et al. | |
| 9,269,243 B2 | 2/2016 | Shet et al. | |
| 9,411,072 B1 | 8/2016 | Dixon | |
| 9,454,884 B1* | 9/2016 | Chen | G08B 13/19697 |
| 10,650,651 B1* | 5/2020 | Roberts | G06K 9/00771 |
| 2003/0025599 A1* | 2/2003 | Monroe | G08B 13/19691 |
| | | | 709/200 |
| 2004/0263322 A1* | 12/2004 | Onaru | G10K 15/04 |
| | | | 340/384.7 |
| 2005/0160325 A1* | 7/2005 | Ogino | G08B 13/19691 |
| | | | 714/47.1 |
| 2006/0279630 A1 | 12/2006 | Aggarwal et al. | |
| 2007/0076094 A1* | 4/2007 | Dickerson | H04N 7/181 |
| | | | 348/E7.086 |
| 2007/0159530 A1* | 7/2007 | Park | G08B 13/19669 |
| | | | 348/143 |
| 2007/0298772 A1* | 12/2007 | Owens | H04M 11/04 |
| | | | 455/414.1 |
| 2008/0088706 A1 | 4/2008 | Girgensohn et al. | |
| 2008/0298693 A1* | 12/2008 | Hampapur | G08B 13/19693 |
| | | | 382/236 |
| 2009/0288011 A1* | 11/2009 | Piran | G06F 3/048 |
| | | | 715/720 |
| 2012/0194336 A1 | 8/2012 | Thiruvengada et al. | |
| 2012/0257062 A1* | 10/2012 | Wang | G08B 13/19693 |
| | | | 348/159 |
| 2013/0015965 A1* | 1/2013 | Udd | G08B 13/19641 |
| | | | 340/501 |
| 2013/0091432 A1 | 4/2013 | Shet et al. | |
| 2015/0103178 A1* | 4/2015 | Itoh | G06K 9/00771 |
| | | | 348/159 |
| 2015/0130947 A1* | 5/2015 | Ono | G08B 13/19645 |
| | | | 348/159 |
| 2016/0119553 A1* | 4/2016 | Alm | H04N 5/272 |
| | | | 382/103 |
| 2016/0364123 A1 | 12/2016 | Burns et al. | |
| 2016/0364129 A1 | 12/2016 | McLean et al. | |
| 2017/0277785 A1* | 9/2017 | Burke | G06F 16/78 |
| 2017/0351906 A1* | 12/2017 | Oguchi | G06F 3/04817 |
| 2018/0025231 A1 | 1/2018 | Noh et al. | |
| 2018/0033153 A1* | 2/2018 | Hirasawa | G06K 9/00 |
| 2018/0047266 A1* | 2/2018 | Siminoff | H04M 11/025 |
| 2018/0131554 A1* | 5/2018 | Liu | H04B 1/38 |
| 2019/0022190 A1* | 1/2019 | Despanie | A61K 47/643 |
| 2019/0164412 A1* | 5/2019 | Kennedy-Foster | |
| | | | G08B 13/19682 |
| 2019/0221090 A1* | 7/2019 | Beiser | G06K 9/6274 |
| 2020/0137358 A1* | 4/2020 | Fernandez Orellana | |
| | | | G08B 13/19695 |

OTHER PUBLICATIONS

International Search Report for corresponding International Application No. PCT/CA2019/051581 dated Jan. 23, 2020.

* cited by examiner

```
Initialize
    rate = characteristic_rate
    threshold = filter_threshold
    value = initial_value
    prev_time = start_time For each event
    value *= exp(-rate*(event.time - prev_time))
    prev_time = event.time if value < threshold
        value += 1
        accept event
    else
        reject event
```

FIG. 12

METHOD AND SYSTEM FOR DISPLAYING VIDEO STREAMS

RELATED U.S. APPLICATION DATA

This application claims the benefit of U.S. provisional patent application No. 62/756,418 filed on Nov. 6, 2018, and U.S. provisional patent application No. 62/829,894, filed on Apr. 5, 2019, and the entire contents of both applications are hereby incorporated by reference.

FIELD OF THE DISCLOSURE

The present disclosure relates to methods and systems for displaying video streams on a display, such as a graphical user interface.

BACKGROUND TO THE DISCLOSURE

In many video surveillance systems, multiple cameras simultaneously generate video streams, and, in each video stream, one or more events may be detected. For example, objects such as people or vehicles may be present and may be detected by a camera using video analytics. In addition, the objects may be performing actions that are suspicious, such as moving in areas they do not have permission to access. For instance, a person within a restricted location may be detected by a camera. The detection of the person in the restricted location may trigger an alarm and may require further investigation. For example, security personnel may be alerted to the potential security breach. On the other hand, the objects may be performing actions that are not suspicious and that, while still being detected by one or more cameras, do not require further investigation. For example, a person may be moving along a hallway of a building which they are authorized to access.

Determining which events are "normal" (e.g. are not suspicious) and which events require further investigation may be difficult for one or even several security operators of the video surveillance system. The situation is complicated by the fact that, at any given moment, there may be multiple events detected by multiple cameras, each requiring at least a portion of an operator's attention to determine whether the event requires further investigation.

In order to handle large numbers of detected events, video streams capturing the events are typically shown on a display for review by an operator. However, with many different events being detected, as well as differences in the priorities of the events (e.g. simple motion of a person vs. a person detected in a restricted area), it can be difficult for operators to efficiently assimilate the information presented to them on the display, and rapidly identify those events that may be dismissed as benign, and those events that require more of their attention. In addition, when a new event is detected and the corresponding video stream is suddenly presented on the display, it can be difficult and jarring for the operator to keep track of the various video streams on their display.

The present disclosure seeks to address at least some of the above-noted difficulties of managing and reviewing video streams on a display.

SUMMARY OF THE DISCLOSURE

According to a first aspect, there is provided a method that includes detecting a plurality of events within a plurality of video streams, each of the plurality of events having a respective arrival time. The method also includes categorizing, concurrently with respective arrival times, each of the plurality of events into a respective one of a plurality of groups. The categorizing is based on at least one of video capture device identity and event type. The method also includes determining, for each of the plurality of groups, a frequency in which events are categorized into the respective group. The method also includes selectively displaying at least one video frame of an event in accordance with a likelihood varying inversely in relation to the respective determined frequency for a group of the plurality of groups with respect to which the event is categorized into.

According to another aspect, there is provided a method comprising: detecting multiple events; displaying multiple video streams on a display, wherein the display comprises at least one primary display window and multiple secondary display windows smaller than the primary display window, wherein the primary and secondary display windows define an ordered sequence of display windows, wherein each video stream is associated with one of the detected events and is associated with a corresponding priority level, and wherein the displaying comprises: displaying in the primary display window a first one of the video streams; and displaying other ones of the video streams in respective ones of the secondary display windows, wherein each other one of the video streams is associated with a priority level that is lower than the priority level of the first one of the video streams; detecting a first further event; and in response thereto: shifting the display of one or more of the video streams to the next one or more secondary display windows in the ordered sequence of display windows; and displaying a new video stream in a first available display window in the ordered sequence of display windows, wherein the new video stream is associated with the detected first further event.

The method may further comprise, in response to detecting the first further event, ceasing display of the video stream in the last display window in the ordered sequence of display windows.

The method may further comprise preventing a displayed video stream from shifting to the next secondary display window in the ordered sequence of display windows.

The first available display window may comprise the primary display window.

The first available display window may comprise the first secondary display window in the ordered sequence of display windows.

Priority levels may be ranked from highest to lowest according to the following priority levels: alarm, unusual motion, analytics, and usual motion.

A video stream associated with a more recent event may be associated with a higher priority level than a video stream associated with a less recent event.

The method may further comprise, in response to user input, ceasing display of a video stream.

The method may further comprise, in response to ceasing display of the video stream, adding to an event log an indication of the event associated with the video stream.

The method may further comprise re-initiating display of the video stream in response to a user input being received in connection with the indication.

The method may further comprise, in response to user input, shifting the display of a video stream to another display window.

The priority level associated with the first video stream may be an alarm, and the shifting of the display of the first video stream may be prevented until the alarm is acknowledged via user input.

The method may further comprise, in response to user input, transmitting a selected video stream to a remote device.

A detected event may comprise one or more of: an alarm being triggered, unusual motion of an object, an object being identified or classified, and usual motion of an object.

The method may further comprise: determining one or more patterns associated with user-selected ceasing of the display of video streams; and preventing the display of further video streams based on the one or more patterns.

The method may further comprise: determining one or more patterns associated with user-selected preventing of shifting of the display of video streams; and escalating the priority levels associated with further video streams based on the one or more patterns.

The one or more patterns may be determined using a machine learning module.

The method may further comprise: detecting with a camera a second further event, wherein the second further event is associated with a priority level; determining that a displayed video stream is associated with the same priority level as the detected second further event, and that the displayed video stream was obtained using the camera; and preventing a video stream comprising the second further event from being displayed on the display.

The preventing may comprise preventing a video stream comprising the second further event from being displayed on the display if a user-defined period of time has not elapsed since the displayed video stream was displayed on the display.

The secondary display windows may be positioned along one or more edges of the primary display window.

The method may further comprise: determining that an object in a video stream is the same as another object in another video stream; and in response thereto, displaying the video stream in the primary display window.

The ordered sequence may start at the primary display window, proceed to one of the secondary display windows, and further proceed to the next nearest secondary display window.

The ordered sequence may start at one of the secondary display windows, and proceed to the next nearest secondary display window.

According to another aspect, there is provided a method comprising: displaying multiple video streams on a display, wherein the display comprises at least one primary display window and multiple secondary display windows smaller than the primary display window, wherein the primary and secondary display windows define an ordered sequence of display windows, wherein each video stream is associated with an event and is associated with a corresponding priority level, and wherein the displaying comprises: displaying in the primary display window a first one of the video streams; displaying other ones of the video streams in respective ones of the secondary display windows, wherein each other one of the video streams is associated with a priority level that is lower than the priority level of the first one of the video streams; shifting the display of one or more of the video streams to the next one or more secondary display windows in the ordered sequence of display windows; and displaying a new video stream in a first available display window in the ordered sequence of display windows, wherein the new video stream is associated with a further event.

According to another aspect, there is provided a system comprising: one or more cameras; and one or more processors communicative with memory having stored thereon computer program code configured when executed by the one or more processors to cause the one or more processors to perform a method comprising: detecting multiple events; displaying, using the one or more cameras, multiple video streams on a display, wherein the display comprises at least one primary display window and multiple secondary display windows smaller than the primary display window, wherein the primary and secondary display windows define an ordered sequence of display windows, wherein each video stream is associated with one of the detected events and is associated with a corresponding priority level, and wherein the displaying comprises: displaying in the primary display window a first one of the video streams; and displaying other ones of the video streams in respective ones of the secondary display windows, wherein each other one of the video streams is associated with a priority level that is lower than the priority level of the first one of the video streams; detecting a first further event; and in response thereto: shifting the display of one or more of the video streams to the next one or more secondary display windows in the ordered sequence of display windows; and displaying, using the one or more cameras, a new video stream in a first available display window in the ordered sequence of display windows, wherein the new video stream is associated with the detected first further event.

More generally, the system may be configured to perform any of the foregoing aspects of the method or suitable combinations thereof.

According to another aspect, there is provided a computer-readable medium having stored thereon computer program code configured when executed by one or more processors to cause the one or more processors to perform any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Reference will now be made, by way of example, to the accompanying drawings:

FIG. 12 is an example listing for an algorithm for an event filter in accordance with an example embodiment.

Figure 1:
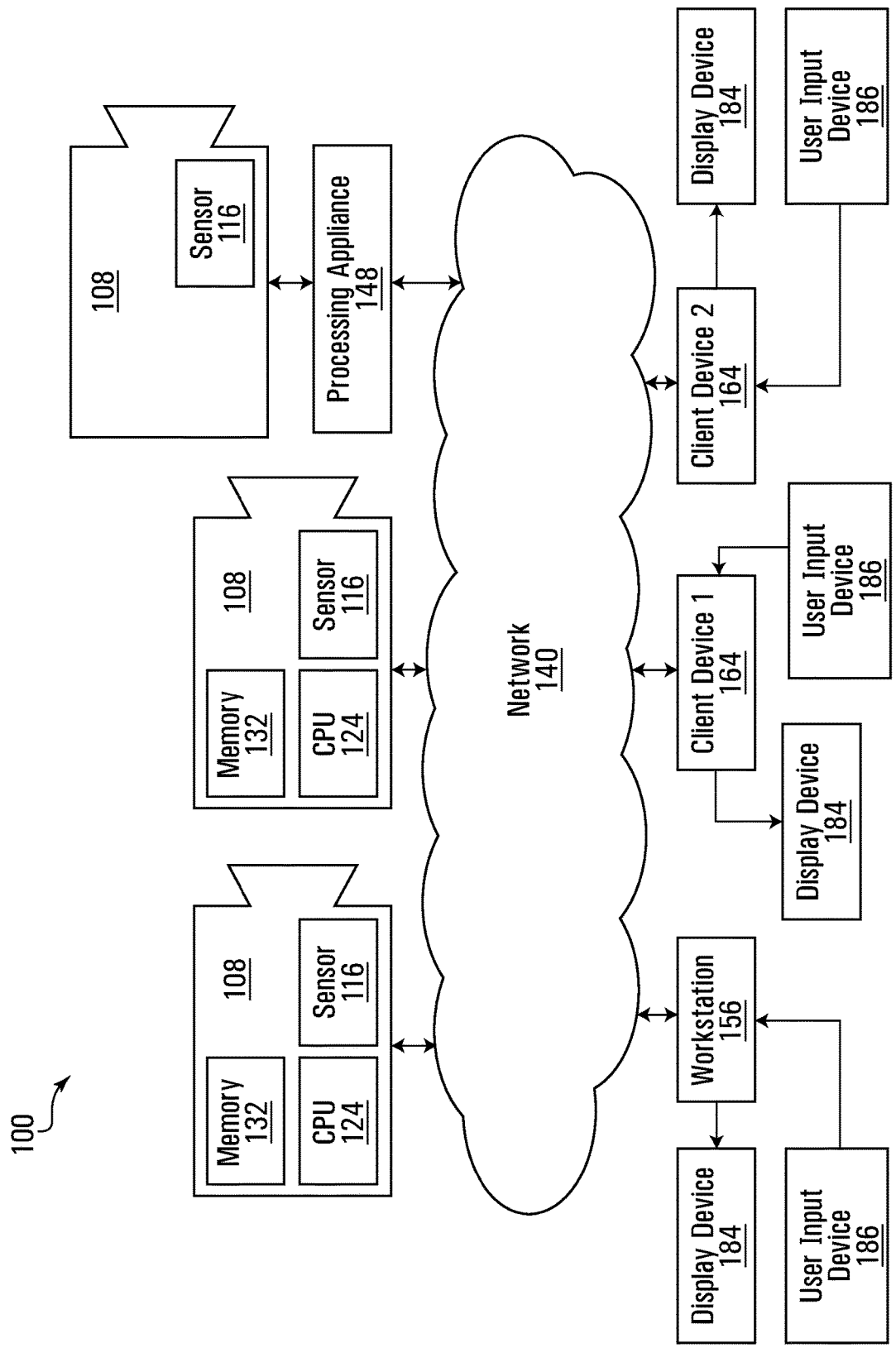
FIG. 1 illustrates a block diagram of connected devices of a video capture and playback system according to an example embodiment.

It will be appreciated that, for simplicity and clarity of illustration, elements shown in the figures have not necessarily been drawn to scale. For example, the dimensions of some of the elements may be exaggerated relative to other elements. Furthermore, where considered appropriate, reference numerals may be repeated among the figures to indicate corresponding or analogous elements.

DETAILED DESCRIPTION OF EXAMPLE EMBODIMENTS

The present disclosure seeks to provide methods and systems for displaying video streams on a display. While various embodiments of the disclosure are described below, the disclosure is not limited to these embodiments, and variations of these embodiments may well fall within the scope of the disclosure which is to be limited only by the appended claims.

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms "coupled", "coupling", or "connected" can have a mechanical, electrical or algorithmic connotation. For example, as used herein, the terms "coupled", "coupling", or "connected" can indicate that two elements or devices are directly connected to one another or connected to one another through one or more intermediate elements or devices via an electrical element, electrical signal, mechanical element or the transmission of data mediated by a computer program depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (e.g., 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames, or for indexing image data in a database with respect to interpretable properties of detected objects such as their colors, categories as persons or vehicles, vehicle make or model, or human demographic information.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit", "module", or "system". Furthermore, the various example embodiments may take the form of a computer program product on a computer-usable storage medium having computer-usable program code embodied in the medium.

Any suitable computer-usable or computer readable medium may be used. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 (also referred to as camera 108) is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal feature is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g. a random access memory and a cache memory) employed during execution of program instructions. The processor executes computer program instructions (e.g., an operating system and/or application programs), which can be stored in the memory device.

In various embodiments, the processor 124 may be implemented by any processing circuit having one or more circuit units, including a digital signal processor (DSP), graphics processing unit (GPU), video processing unit, or vision processing unit (VPU), embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (e.g. server), each having one or more processors which may include graphics processing units (GPUs). The at least one workstation 156 may also include storage memory and includes at least one display device 184 and at least one user input device 186 (e.g.: mouse, keyboard, touchscreen). The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device 184 and at least one user input device 186 The client device 164 is operable to display on its display device 184 a user interface for displaying information, receiving user input, and playing back, including one or more video streams generated by one or more of video capture devices 108, as explained further below. For example, the client device 164 may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
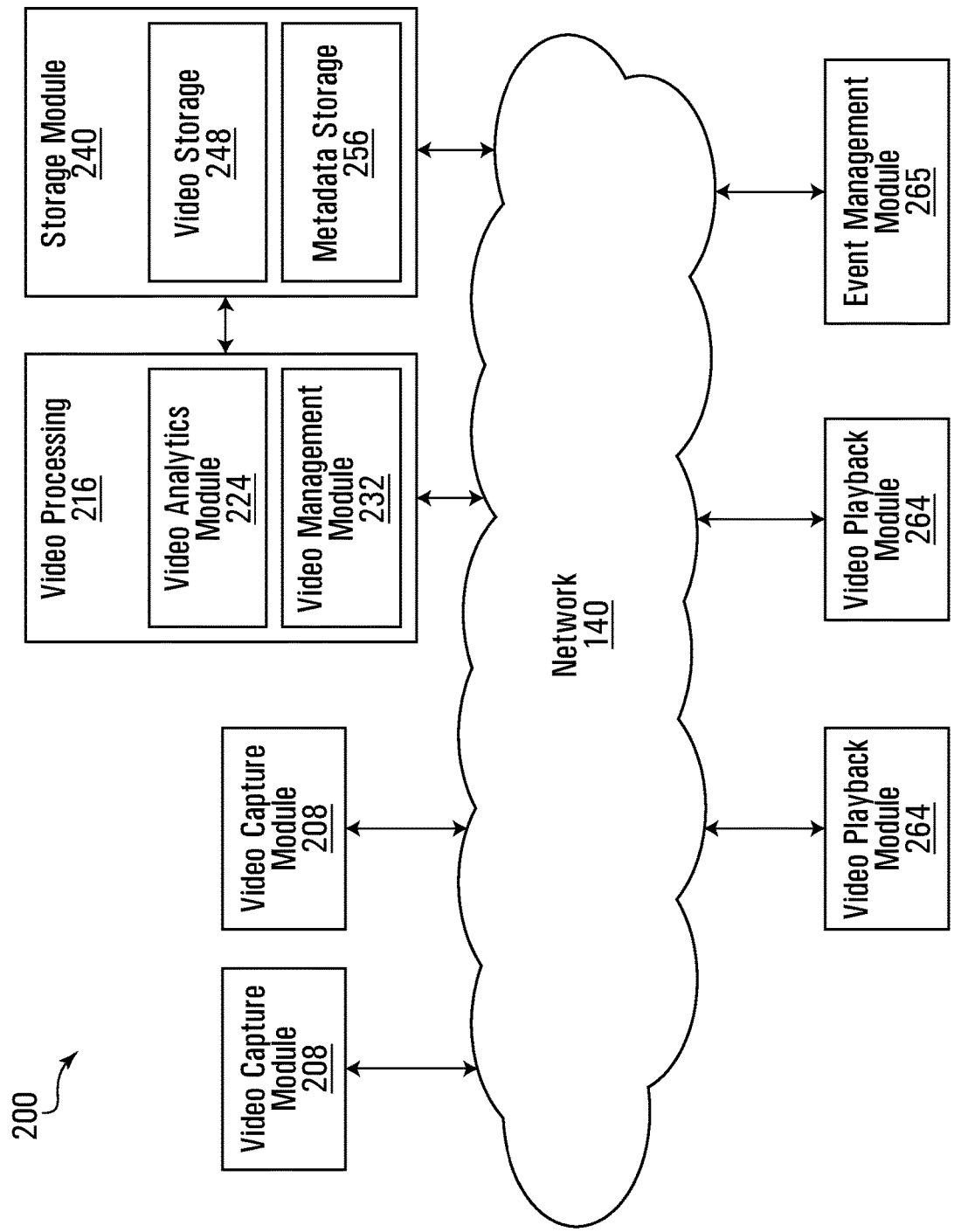
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100, according to one example embodiment. The operational modules may be implemented in hardware, software or both on one or more of the devices of the video capture and playback system 100 as illustrated in FIG. 1.

The set 200 of operational modules includes at least one video capture module 208. For example, each video capture device 108 may implement a video capture module 208. The video capture module 208 is operable to control one or more components (e.g. sensor 116, etc.) of a video capture device 108 to capture images.

The set 200 of operational modules includes a subset 216 of image data processing modules. For example, and as illustrated, the subset 216 of image data processing modules may include a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. In the embodiments described herein, the determinations may include determining and assigning a priority level to detected events, and the output metadata may include characteristics relevant to the assigned priority level. Other examples of determinations made by the video analytics module 224 may include one or more of foreground/background segmentation, object detection, object tracking, object classification, virtual tripwire, anomaly detection, face detection, facial recognition, license plate recognition, identifying objects "left behind", monitoring objects (e.g. to protect from stealing), unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 may receive input from the video analytics module 224 and adjust compression/storage/transmission based on the content of the video, and can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules includes a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a display of client device 164.

The set of operational modules further includes at least one event management module 265. Event management module 265 is configured to assign priority levels to detected events. For example, video analytics module 224 may perform video analytics on image data obtained from cameras 108, which may include for example detecting movement of objects, detecting objects, and classifying objects. Event management module 265 may assign priority levels based on detected motion, or objects detected/classified, by video analytics module 224. In addition, event management module 265 may detect events based on the output of one or more sensors. For example, a proximity sensor may trigger an alarm in response to the proximity sensor detecting movement of a person or other object in its vicinity, and event management module 265 may in response detect that an alarm-level event has occurred. Other events may be based on, for example, any of the following: object detection, object tracking, object classification, virtual tripwire, anomaly detection, face detection, license plate recognition, people counting, object "left behind", object removed, unusual motion, appearance matching, face matching, facet matching, and business intelligence. Event management module 265 may furthermore assign a priority level of Alarm to the detected event, as described in further detail below. In some examples, the event management module 265 may be included in a client device. In some examples, the event management module 265 may be included in a server device. In still other examples, the event management module 265 may be implemented in some other manner, such as partly in a client device and partly in a server device.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
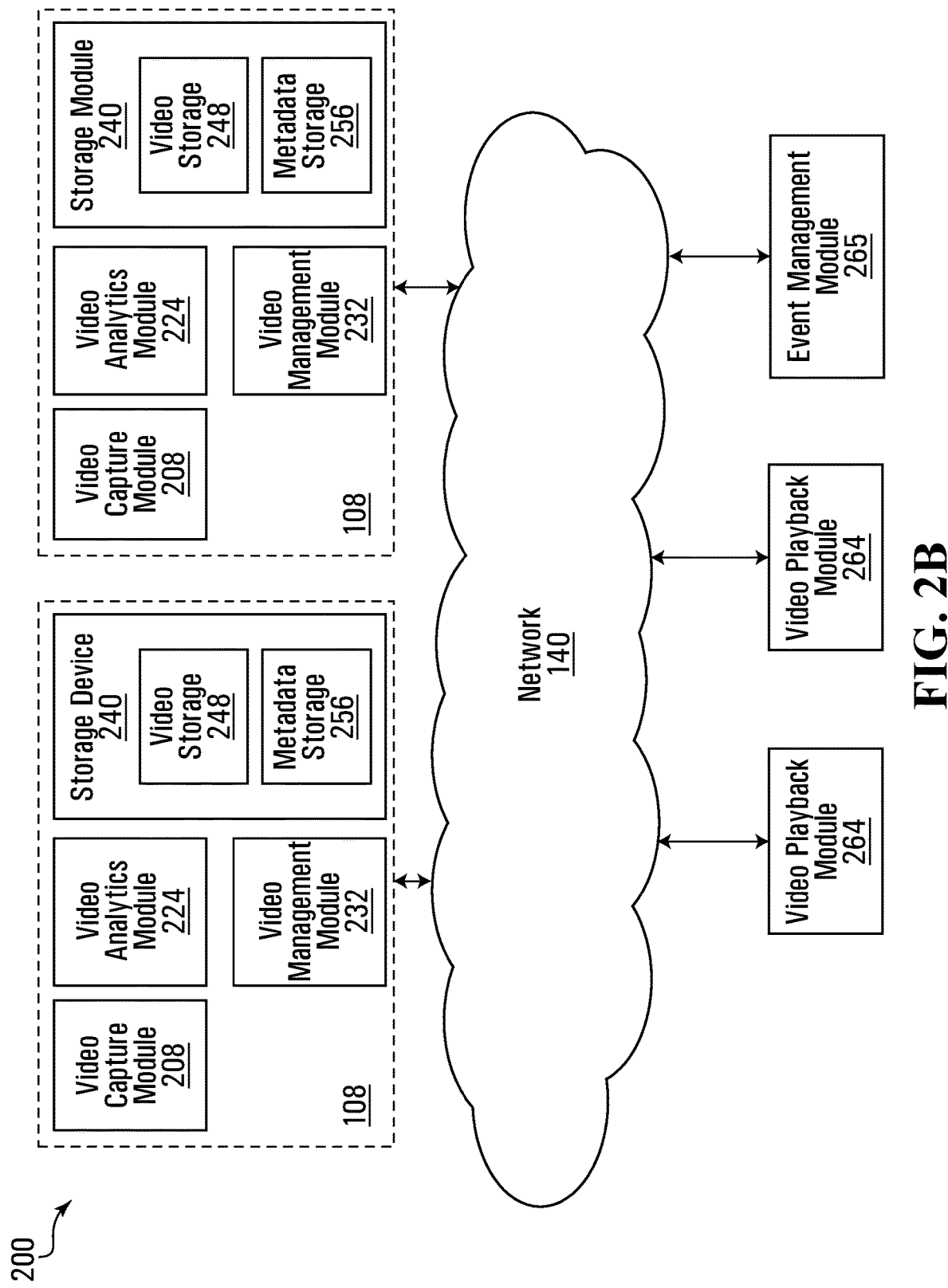
FIG. 2B illustrates a block diagram of a set of operational modules of the video capture and playback system according to one particular example embodiment.

Referring now to FIG. 2B, therein illustrated is a block diagram of a set 200 of operational modules of the video capture and playback system 100 according to one particular example embodiment wherein the video analytics module 224, the video management module 232 and the storage module 240 are wholly implemented on the one or more image capture devices 108. Alternatively, the video analytics module 224, the video management module 232 and the storage module 240 are wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

Figure 3:
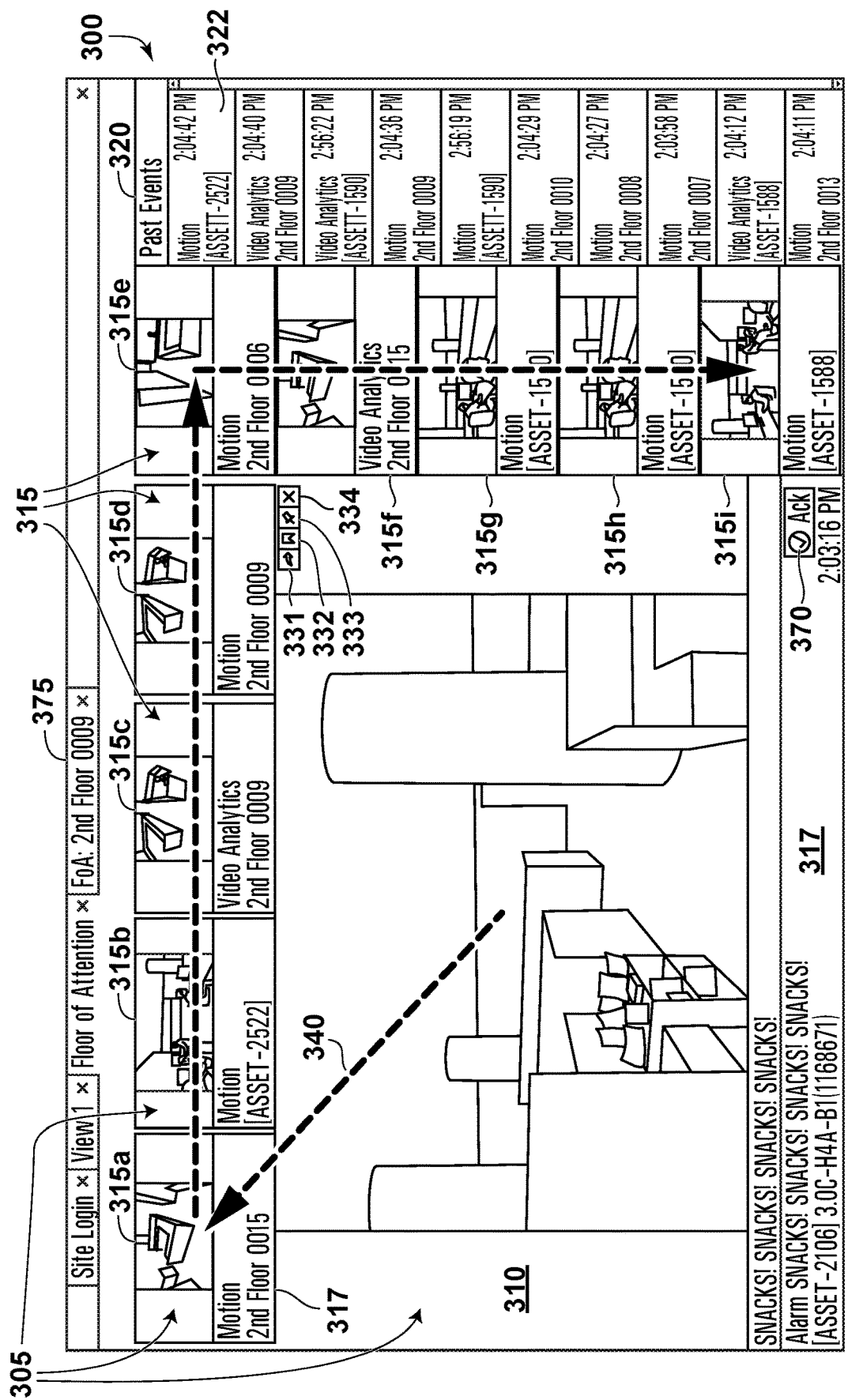
FIG. 3 illustrates a display showing multiple video streams capturing events, according to one particular example embodiment.

Turning to FIG. 3, there is shown a display 300, or graphical user interface (GUI), according to an embodiment of the disclosure. Display 300 may be shown on the display device 184 of client device 164, and is used to show video generated by cameras 108 (in what follows, the video generated by a camera 108 may be referred to as a video stream). Event management module 265 and video playback module 264 control the selection and playback of video streams on display 300, as described in further detail below.

Display 300 comprises multiple display windows 305, each display window 305 comprising a portion of display 300. Display windows 305 comprise a primary display window 310 and multiple relatively smaller secondary display windows 315 (individually, secondary display windows 315a-315i) arranged generally along a top edge of primary display window 310 and a right edge of primary display window 310. In some embodiments, the arrangement of display windows 305 may take various other forms. For example, there may be more than one primary display window 310, and more or fewer secondary display windows 315. In addition, secondary display windows 315 may be arranged differently relative to primary display window 310.

In what follows, when the text refers to a video stream comprising an event, this means that the particular object or motion that triggered the event is comprised within the image data making up the video stream. For example, an object that is determined by video analytics module 224 to be moving may constitute an event, as would be determined by the rules set in event management module 265. A video stream comprising such an event would include video of the object in motion. On the other hand, a video stream may simply be associated with a detected event, in the case where the event does not necessarily comprise movement of an object. For example, assume that an alarm is triggered in response to a door being opened, thereby providing access to a restricted room. In response to the triggering of the alarm, a video stream showing the interior of the restricted room (but not necessarily the door that was opened) may be displayed on display 300.

Each display window 305 is used to display a video stream generated by a camera 108. The video stream comprises, or is associated with, one or more events detected by event management module 265, as described in further detail below. Each display window 305 includes text 317 derived from metadata associated with the event, which identifies, for example, the type of event comprised in the video stream, a priority level assigned to the event, a location of camera 108 that captured or is associated with the event, as well as a timestamp associated with a current image being shown in display window 305. For instance, text 317 may include an indication, such as color-coding, identifying the priority level assigned to the event in the video stream.

Each display window 305 further includes icons 331, 332, 333, 334 (in FIG. 3, only shown in connection with primary display window 310) that a user may interact with, as described in further detail below. In particular, each display window 305 includes a send icon 331, a bookmark icon 332, a pin icon 333, and a remove icon 334.

Display 300 further comprises an event log window 320. Event log window 320 comprises multiple stored entries 322 that a user may interact with, as described in further detail below.

Events detected by event management module 265 are assigned, by event management module 265, a priority level according to the type of event that is detected. The number of different priority levels that may be used is not fixed, and as described below a user may configure new, customized priority levels depending on the type of event the user wishes to detect. In some embodiments, the priority levels comprise, from highest priority to lowest priority, the following: Alarms; Unusual Motion; Video Analytics; and Usual Motion.

An event may be assigned a priority level of Alarm if event management module 265 determines that an alarm has been triggered. Alarms are triggered by rules based on other events. For example, if video analytics module 224 determines that an identified object, such as a person, is moving within an area they do not have permission to access, event management module 265 may, based on an Alarm event rule set by a user, determine that an alarm has been triggered and may assign a priority level of Alarm to the event, the event in this case comprising the person moving within the area they do not have permission to access. An event may also be assigned a priority level of Alarm if a sensor is triggered, for example. For instance, in the case of a restricted area being accessed by an unauthorized person, a proximity sensor adjacent a door providing access to the restricted area may be triggered in response to the unauthorized person using the door. The output of the proximity sensor may be received at event management module 265 which may then determine that an alarm has been triggered. Event management module 265 may then assign a priority level of Alarm to the detected entry into the restricted area.

An event may be assigned a priority level of Unusual Motion if event management module 265 determines that unusual motion has been detected. Unusual motion may include, for example, motion in a hallway at night, when ordinarily no motion occurs in the hallway after working hours; or a car moving in a direction that is not normal for a street, for example a car moving in the wrong direction on an one way street. For instance, if video analytics module 224 determines that an identified object, such as a person, is running along a corridor, event management module 265 may determine than unusual motion has been detected and may assign a priority level of Unusual Motion to the event, the event in this case comprising the person running along the corridor.

An event may be assigned a priority level of Video Analytics in response to video analytics module 224 identifying or classifying an object. For example, video analytics module 224 may detect/identify an object moving within a scene, and may classify the object as a person. In response, event management module 265 may determine than an object has been identified and classified, and may assign a priority level of Video Analytics to the event, the event in this case comprising the identification and classification of the object.

An event may be assigned a priority level of Usual Motion in response to video analytics module 224 determining that usual motion has been detected. For example, video analytics module 224 may detect typical, usual motion of an object within a scene. Examples of usual motion may include a person working at their assigned desk, a person moving within an office space to which they have authorized access. In response, event management module 265 may determine than usual motion has been detected and may assign a priority level of Usual Motion to the event, the event in this case comprising the motion of the object.

As mentioned above, a user may customize additional priority levels for additional types of events. For example, a user may define a set of rules that cause event management module 265 to assign a priority level of User-Customization to an event. In some embodiments, the event may comprise video analytics module 224 determining that a particular individual is moving. A User-Customized priority level is typically associated with events of particular interest to a user, and thus in some embodiments the priority of such events is set between that of Alarms and Unusual Motion, although the priority ranking may be adjusted by a user if they wish.

In addition to the above priority levels, an event's priority is also determined at least in part based on how recently it was detected, as described in further detail below. In particular, the most recently detected event is generally assigned a higher priority than older events.

In what follows, when the text refers to an event being displayed in a display window 305, reference is also being made to the fact that the video stream that comprises the event (e.g. the video stream in which the event occurs) is displayed in the display window 305.

As described above, each display window 305 is used to display a video stream generated by a camera 108. When an event is detected by event management module 265, the video stream generated by camera 108 and comprising or associated with the event is displayed on display 300. In order for the operator to view the event, the video stream displayed on display 300 comprises a recording that commences at a point in time before the occurrence of the event (e.g. 5 seconds before the event). The operator may elect to pause, rewind, fast-forward, restart, etc. the recording by interacting with the display window 305 in which the video stream is being shown.

Display windows 305 define an ordered sequence of display windows 305, the ordered sequence defining the direction in which video streams are cycled through display windows 305 as new events are detected. In the present embodiment, the ordered sequence of display windows 305 is defined by arrow 340, and begins at primary display window 310 and ends at secondary display window 315*i*, and in particular is defined as follows: display window 310, display window 315*a*, display window 315*b*, display window 315*c*, display window 315*d*, display window 315*e*, display window 315*f*, display window 315*g*, display window 315*h*, and display window 315*i*. As new events are detected by cameras 108, they are initially displayed in primary display window 310, and gradually move from primary display window 310 to secondary display windows 315 to make room for new events. Thus, as a default, the most recent event is displayed first in primary display window 310. When a new event is detected, display of the previous event is shifted from primary display window 310 to the first secondary display window 315a in the ordered sequence of display windows 305, and the new event is displayed in primary display window 310. The shifting is repeated for all other video streams displayed in secondary display windows 315, to accommodate the shifting of the event previously shown in primary display window 310, from primary display window 310 to secondary display window 315a. The video stream displayed in display window 315i is removed from display 300. Thus, the display of video streams operates generally according to a first-in, first-out process.

While display windows 305 define an ordered sequence as described above, the priority level assigned to an event may determine whether the event is displayed first in primary display window 310 or a secondary display window 315. Primary display window 310 is larger than each secondary display window 315, and therefore is generally reserved for video streams that comprise the most recently detected event, or events determined to be of a relatively higher priority (e.g. triggered alarms) than events currently comprised in video streams displayed in secondary display windows 315.

The following comprises a discussion of exemplary methods of how video streams and their associated events are displayed on display 300.

Figure 5:
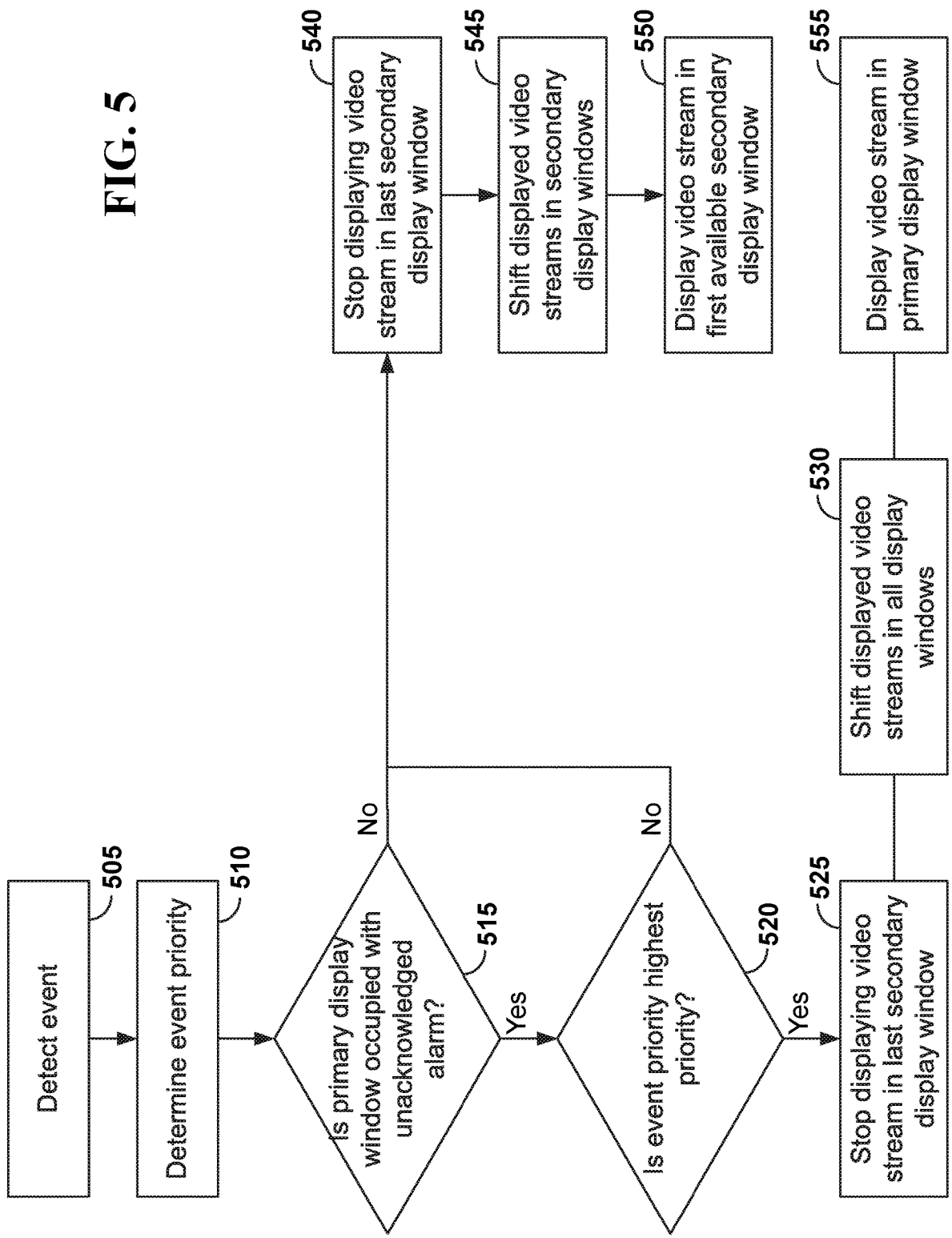
FIG. 5 illustrates a flow diagram of a method of displaying video streams on display.

Turning to FIG. 5, there is shown a method 500 of displaying video streams on display 300, according to embodiments of the disclosure. At block 505, event management module 265 determines that an event has been detected. At block 510, event management module 265 determines a priority level that is to be assigned to the event. The priority level that is assigned depends on the type of event that is detected, as described above. For example, if usual motion of an object is detected (for instance a person working at their assigned desk), then event management module 265 may assign a priority level of Usual Motion to the event (in some embodiments, the lowest available priority level). If on the other hand an alarm has been triggered, then event management module 265 may assign a priority level of Alarm to the event (in some embodiments, the highest available priority level).

At block 515, video playback module 264 determines whether primary display window 310 is currently being used for display of a video stream associated with an unacknowledged alarm. In particular, video playback module 264 determines whether a video stream associated with a priority level of Alarm (i.e. the video stream comprises an Alarm-level event) is currently being displayed in primary display window 310, and whether the alarm has yet to be acknowledged by the user. As will be discussed in more detail below, video streams comprising Alarm-level events may be acknowledged by a user via interaction with display 300. If a video stream comprising an Alarm-level event is currently being displayed in primary display window 310 and has yet to be acknowledged by the user, then, at block 540, video playback module 264 stops displaying the video stream in the last secondary display window in the ordered sequence of display windows 315. For example, referring to FIG. 3, video playback module 264 stops displaying the video stream displayed in secondary display window 315i. At block 545, each displayed video stream in secondary display windows 315 is shifted to the next secondary display window 315 in the ordered sequence of display windows 305. In other words, substantially simultaneously, the video stream in secondary display window 315a is shifted to secondary display window 315b, the video stream in secondary display window 315b is shifted to secondary display window 315c, the video stream in secondary display window 315c is shifted to secondary display window 315d, etc. At block 550, a new video stream comprising the newly detected event is displayed in the first available secondary display window 315. Thus, referring to FIG. 3, the newly detected event is shown in a video stream displayed in secondary display window 315a which has been made available by the shifting of the video stream previously shown in secondary display window 315a, from secondary display window 315a to secondary display window 315b.

If a video stream comprising an Alarm-level event is currently being displayed in primary display window 310 but has been acknowledged by the user, or if there is no video stream comprising an Alarm-level event currently being displayed in primary display window 310, then, at block 520, video playback module 264 determines whether the priority level determined at block 510 is the highest priority level among all priority levels associated with all currently displayed video streams. For example, each currently displayed video stream may be associated with a priority level of Usual Motion. If a camera 108 then detects (at block 505) a person running along a corridor (such an event being indicative of unusual motion, and therefore being assigned a priority level of Unusual Motion), then video playback module 264 may determine at block 520 that the new event detected at block 505 has the highest priority level among all events currently comprised in the video streams displayed on display 300. If the newly detected event does not have the highest priority level from among all events comprised in the video streams displayed in all display windows 305, then the process proceeds to block 525. If, on the other hand, the newly detected event does have the highest priority level from among all events comprised in the video streams displayed in all display windows 305, then the process proceeds to block 540.

At block 525, video playback module 264 stops displaying the video stream in the last secondary display window in the ordered sequence of display windows 315. For example, referring to FIG. 3, video playback module 264 stops displaying the video stream displayed in secondary display window 315i. At block 530, each displayed video stream in all display windows 305 (i.e. primary display window 310 and all secondary display windows 315 except secondary display window 315i) is shifted to the next display window 305 in the ordered sequence of display windows 305. In other words, substantially simultaneously, the video stream in primary display window 310 is shifted to secondary display window 315a, the video stream in secondary display window 315a is shifted to secondary display window 315b, the video stream in secondary display window 315b is shifted to secondary display window 315c, etc. At block 555, a new video stream comprising the newly detected event is displayed in primary display window 310 which has been made available by the shifting of the video stream previously shown in primary display window 310, from primary display window 310 to secondary display window 315a.

A user of the system may interact with display 300 in a number of different ways, as described below, in order to better manage the appearances of new video streams capturing newly detected events.

In particular, a user may prevent a displayed video stream from shifting to the next display window 305 in the ordered sequence of display windows 305, by activating pin icon 333 on the display window. For example, if a user is unsure whether a particular video stream requires further investigation, then they may activate pin icon 333 in the display window (for example by using an input device such as a computer mouse) and thereby prevent the video stream shown in the display window from being repositioned by video playback module 264 in response to a detection of a new event. Thus, by pinning one or more video streams to one or more display windows 305, the ordered sequence of display windows 305 is altered such that the shifting of video streams from one display window 305 to the next will bypass any pinned video stream. As an example, and referring to FIG. 3, if the video stream in display window 315c has been pinned, then the video stream in secondary display window 315b will be shifted to secondary display window 315d in response to a new event being detected and a new video stream being displayed on display 300). At any time, the user may choose to unpin a video stream by deactivating pin icon 333.

An event having a priority level of Alarm is typically displayed in primary display window 310 until acknowledged by a user. Triggered alarms are potentially serious events requiring further investigation or consideration. Therefore, so as to reduce the likelihood of a user accidentally overlooking such events when they appear on display 300, a video stream displaying an Alarm-level event may be automatically pinned by video playback module 264 until such a time the user acknowledges the alarm (for example by activating acknowledge icon 370), effectively unpinning the video stream from primary display window 310.

A user may reposition one or more displayed video streams as they wish. For example, a user may elect to reposition the video stream in secondary display window 315b to secondary display window 315g. In doing so, the video stream in secondary display window 315g may either be altogether removed from display 300, or else may take the place of the video stream in secondary display window 315b (what happens to the video stream in secondary display window 315g may be preset by the user).

A user may also cause a video stream to stop being displayed. For example, a user may activate remove icon 334, in response to which the video stream in the display window stops being displayed (the display window may then simply show an empty window). When a video stream is no longer on display (for example in response to a user activating remove icon 334, or after being shifted away from the last secondary display window 315 in the ordered sequence of display windows 305), an entry 322 of the event is added to event log 320. Through event log 320, the user is presented with a list of past events that are no longer being displayed in display windows 305. A user may recall an event no longer being displayed by interacting, via user input, with the relevant entry 322 in event log 320. The event may then be replayed in one of display windows 305. For example, the event may be replayed in primary display window 310 or secondary display window 315a, depending on its priority. Those skilled in the art will appreciate that the start point for replaying an event need not necessarily have exact correspondence to the true start point of the event. For example, the replay start point may actually be set to five seconds earlier in time so as to provide a potentially useful preamble to the person viewing the stored video.

A user may furthermore transmit the contents of a displayed video stream to another device, for example a remote device connected to client device 164 over network 140. Thus, a collaborative approach may be adopted for the management of events. In particular, a first user may interact with display 300 and determine those events that require further investigation. The first user may select such events for transmission to a device of a second user, who may review the transmitted video stream(s) in more detail.

Figure 4:
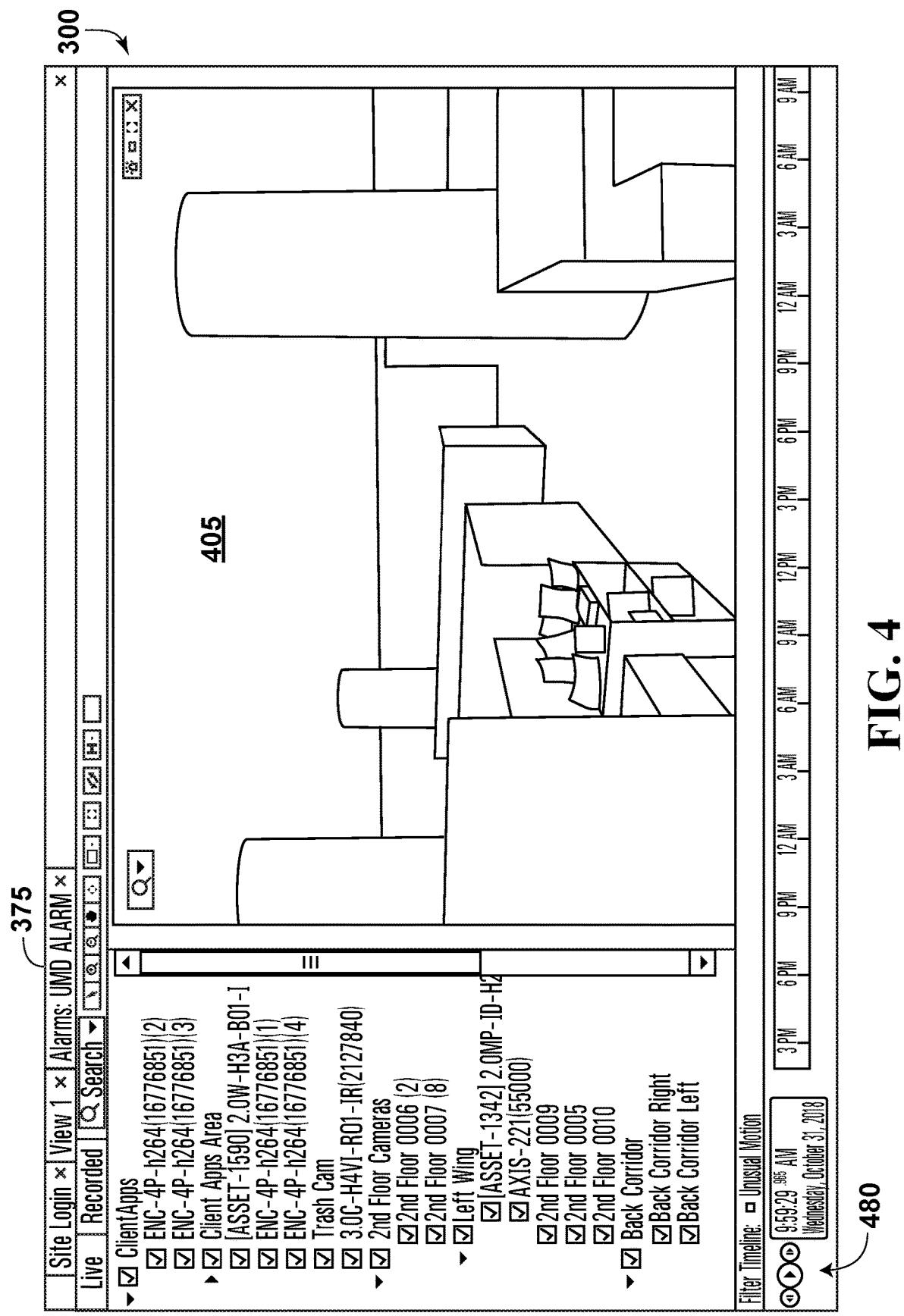
FIG. 4 illustrates a display showing a video stream capturing an event, according to one particular example embodiment.

In addition to transmitting the contents of a displayed video stream, a user may generate a separate display window for one or more selected video streams. For example, the separate display window may be accessed via a tab 375, allowing the user to view the video stream independently of display windows 305. FIG. 4 shows display 300 with a separate display window 405 displaying a video stream. The video stream may be paused, rewound, fast-forwarded, etc., using a control bar 480.

A user may further bookmark a particular video stream by interacting with bookmark icon 332. Bookmarking a video stream stores the video stream, or a link to the video stream, for easy access at a later time.

A user may also send a particular video stream to another user of system 100 by interacting with send icon 331. Sending the video stream may comprise directing the video stream to another client device 164 or workstation 156, or may comprise sending a link to the stream or a recording of the event. The send function allows a user to, for example, send a video stream or event to a mobile security guard, who may be closer to the location of the event. Alternatively, one user may send the video stream or event to another that is responsible for that particular area being monitored or the type of event.

In order to better manage the display of video streams, video playback module 264 may be configured to control the display of video streams based on patterns associated with user-selected preventing of the display of certain events, user-selected preventing of shifting (i.e. pinning) of the display of certain video streams, and user-selected relocation of certain video streams to primary display window 310. For example, video playback module 264 may be communicative with a machine learning module that is operable to apply one or more machine learning techniques known in the art to determine patterns associated with user-selected preventing of the display of certain events, user-selected preventing of shifting (i.e. pinning) of the display of certain video streams, and user-selected relocation of certain video streams to primary display window 310. For instance, if a user consistently ceases the display of video streams associated with events having a priority level of Analytics or Usual Motion between 9 AM and 12 PM on weekdays, then video playback module 264 may determine that such events, during such times, should not be displayed on display 300, or else should be displayed less frequently. Similarly, if a user consistently relocates, to primary display window 310, the display of video streams associated with events having a priority level of Unusual Motion, then video playback module 264 may determine that such events should be automatically pinned when displayed in primary display window 310, and that they should require acknowledgement prior to shifting to secondary display windows 315 in response to new events being detected.

Still further, video playback module 264 may be configured to avoid inefficient duplication of the display of certain events. For instance, if the same person passes through the field of view of a camera 108 several times a minute, and exhibits only usual motion in doing so, then video playback module 264 may determine that only the first instance of the person moving should be displayed on display 300. Future instances of the same person exhibiting the same usual motion within the camera's field of view may be suppressed from being displayed on display 300, at least until a user-configurable cooldown period has expired. If however the same person exhibits different behaviour (for example unusual motion), if a different camera 108 detects the same person, or if a different person is detected by the same camera 108, then the event may be displayed on display 300 in the usual fashion.

Figure 6:
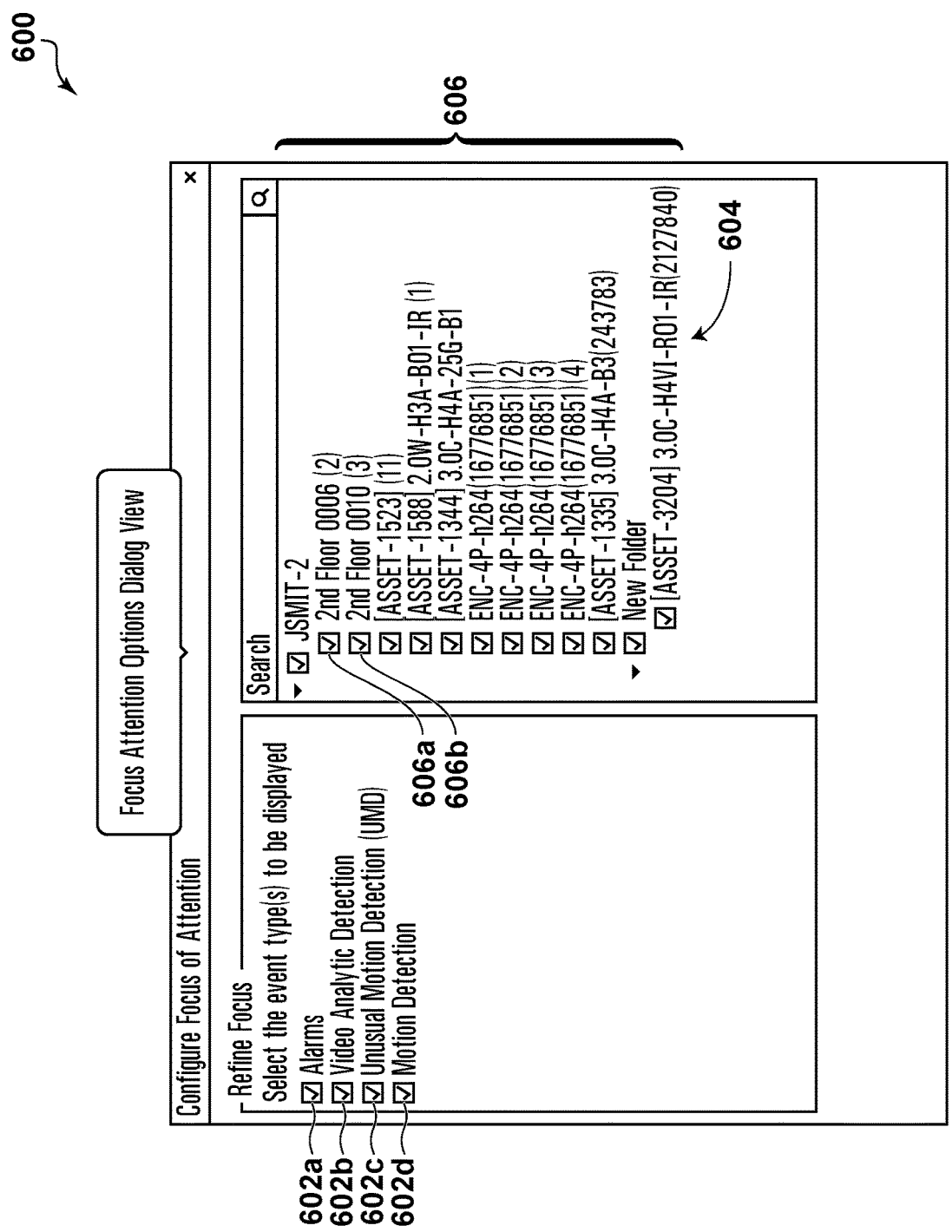
FIG. 6 illustrates a dialog window permitting selection of only certain types of events for display.

FIG. 6 shows an embodiment of a dialog box 600 by which a user, using user input, can select only certain types of events to cause a video stream to be displayed on display 300. The user may make this selection using any one or more of four event selectors 602a-d, each of which in the example embodiment of FIG. 6 is a checkbox: an Alarms selector 602a, a Video Analytic Detection selector 602b, an Unusual Motion Detection selector 602c, and a Motion Detection selector 602d. For example, the user could only select only Unusual Motion Detection via the Unusual Motion Detection selector 602c, in which case only Unusual Motion events will cause a video steam to be brought forward for display. Alternatively, a user could select only Alarms, Video Analytic Detection, and Unusual Motion Detection by using their selectors 602a-c, but not select Motion Detection, for example, in situations in which motion is common.

Likewise, the user can choose to select only certain cameras 108 in certain locations for alerts; for example the user may want to monitor the second floor, and thus cameras 108 not on the second floor would not be selected. An asset selection window 604 comprises part of the dialog box 600 in FIG. 6. The window 604 comprises a list of selectors 606, which in the example of FIG. 6 are checkboxes. Each of the selectors 606 corresponds to one or more different assets, examples of which may include cameras 108, the storage module 240, or other sources of video streams. In an example embodiment in which the user only wishes to monitor the second floor, the user may only select the selectors 606a,b that include the string "2nd Floor" in their names.

In another embodiment, the Video Analytic Detection selector 602b may be further subdivided. For example, the Video Analytic Detection selector 602b may comprise a drop-down list of specific and selectable video analytic events (not shown in FIG. 6). So for example, by selecting only certain of those events, the user may cause video streams to appear on display 300 only in response to the system 100 having detected those events. For example, only "object removed" analytics may be selected in order to monitor an area for theft, in which case other video analytic events are not brought forward and displayed.

Additionally or alternatively, in another example embodiment the dialog box 600 may comprise another selector (not shown in FIG. 6) that subdivides the Video Analytic priority level by type of video analytic. For example, the selector may expose a drop-down list of different types of video analytics of which at least some have different priority levels. For example, a "tripwire" event may be granted a higher priority than an "object left behind" event.

In an embodiment, windows 315 displaying an active, i.e. ongoing, event, may indicate such to the user. For example the windows 315 displaying active events may have a different colored border from windows 315 displaying a view after the event has ended, or the windows 315 displaying an event may include a red image flashing on and off to let the user know they are viewing a live event.

Figure 7:
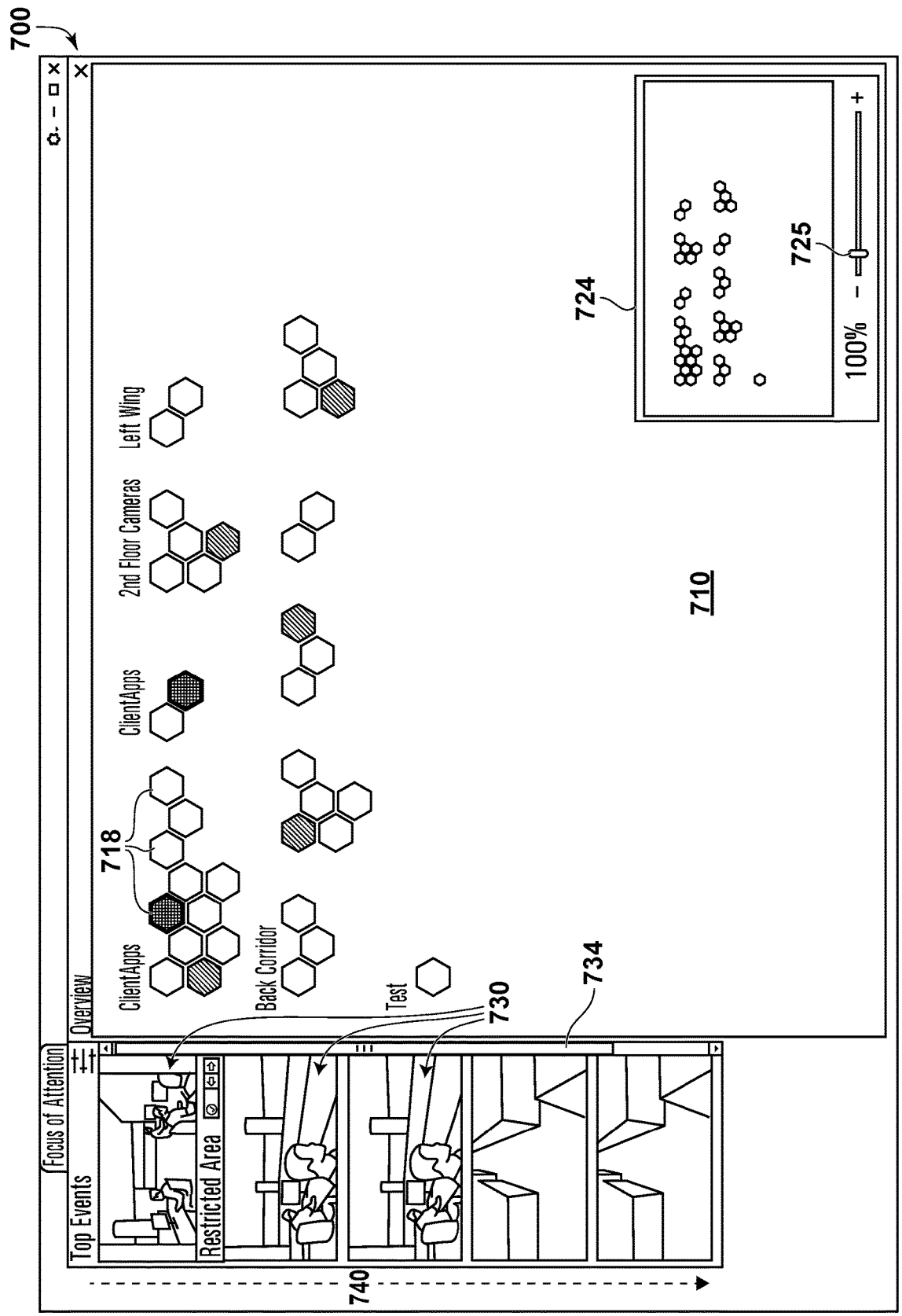
FIG. 7 illustrates, in accordance with an alternative example embodiment, a display showing multiple video streams capturing events.

Reference is now made to FIG. 7 which illustrates a display 700 in accordance with an alternative example embodiment. The display 700 shows, on the left side, multiple video streams (capturing events) as well as an interactive map 710 in a region adjacent the multiple video streams. Within the interactive map 710 are a number of hexagon icons 718, where each icon graphically represents an individual camera. As shown, the hexagon icons 718 are organized into clusters of one or more hexagon icons. In the illustrated example embodiment there are ten clusters shown within the interactive map 710. Also, while in the illustrated example embodiment the icons 718 are hexagons, it will be understood that any suitable shape or combination of shapes is contemplated. A more general term herein used for "hexagon icon" is "tile icon".

In accordance with the illustrated example embodiment, each cluster may represent a group in a system tree. Also, auto sorting into clusters is contemplated (for example, when there are no groups in the user's system tree). Additionally, a navigator 724 is provided within a corner of the interactive map 710. The navigator 724 allows the user to move around parts of the interactive map 710 at a higher level. In some embodiments, the navigator 724 can display all hexagon icons. A zoom control slider 725 is provided to allow the user to modify the resolution at which all hexagon icons are displayed in the navigator 724, such that at one end of a resolution scale, the user can see all hexagon icons (a "zoomed out" view), and at the other end of the resolution scale, only a subset of the system's hexagon icons are displayed (a "zoomed in" view). In other embodiments, particularly for systems having many hexagon icons, zooming out will result in clusters of hexagon elements being combined into single representative elements visually displayed to the user. It is in these ways that the navigator 724 can provide a high-level view of the entire system.

In accordance with some examples, the tile icons 718 can vary in colour and appearance in order to provide event indication information. Although any suitable scheme of colours is contemplated, Table 1 below provides one example in this regard for the purposes of representative explanation.

TABLE 1

Types of Hexagon Icons and Corresponding Events

| Hexagon Color | Icon Has Entirely Same and Continuous Color? | Type of Event |
| --- | --- | --- |
| Grey (First Type) | Yes (this first type is just simple grey) | No motion |
| Grey (Second Type) | No (this second type is a grey outline) | Camera down |
| Solid Blue | Yes | Motion |
| Blue with a Cyan Dot | No (dot within hexagon) | Unusual Motion or Analytic Event |

TABLE 1-continued

Types of Hexagon Icons and Corresponding Events

| Hexagon Color | Icon Has Entirely Same and Continuous Color? | Type of Event |
| --- | --- | --- |
| Red | No (dot within hexagon) | Alarm |
| Green Outline Around Colored Hexagon | No (green outline different color from rest of hexagon) | N/A (Hover indicator - way of indicating to user the camera that corresponds window 730 they are hovering over) |
| Grey with Yellow Hexagon within | No (yellow hexagon is smaller and fits within grey hexagon) | A match for a watchlist, using, for example, facial recognition or license plate recognition |

As mentioned, video streams are shown on the left side of the display 700. In particular, a plurality of windows 730 are included within the display 700. Similar to the previously described FIG. 3 embodiment, there is an ordered sequence of display for the windows 730, which is defined by arrow 740, and begins at an uppermost of the windows 730 and ends at a bottommost of the windows 730. When a new event occurs, determined importance of that new event can determine where amongst the windows 730 will be found the respective video stream.

Also, it is contemplated that the displayed size of the windows 730 may be adjusted. For example by a hold clicking plus rightward mouse movement on the border vertically extending between the region of the windows 730 and the region of the interactive map 710, a user make increase the size of the windows 730. Illustrated slider 734 is provided for the user to scroll down and reveal any additional windows not visible at the top position for the slider 734. In at least some examples, the maximum number of viewable windows 730 may be hard-coded to some fixed positive integer value (such as, for instance, ten windows).

Figure 8:
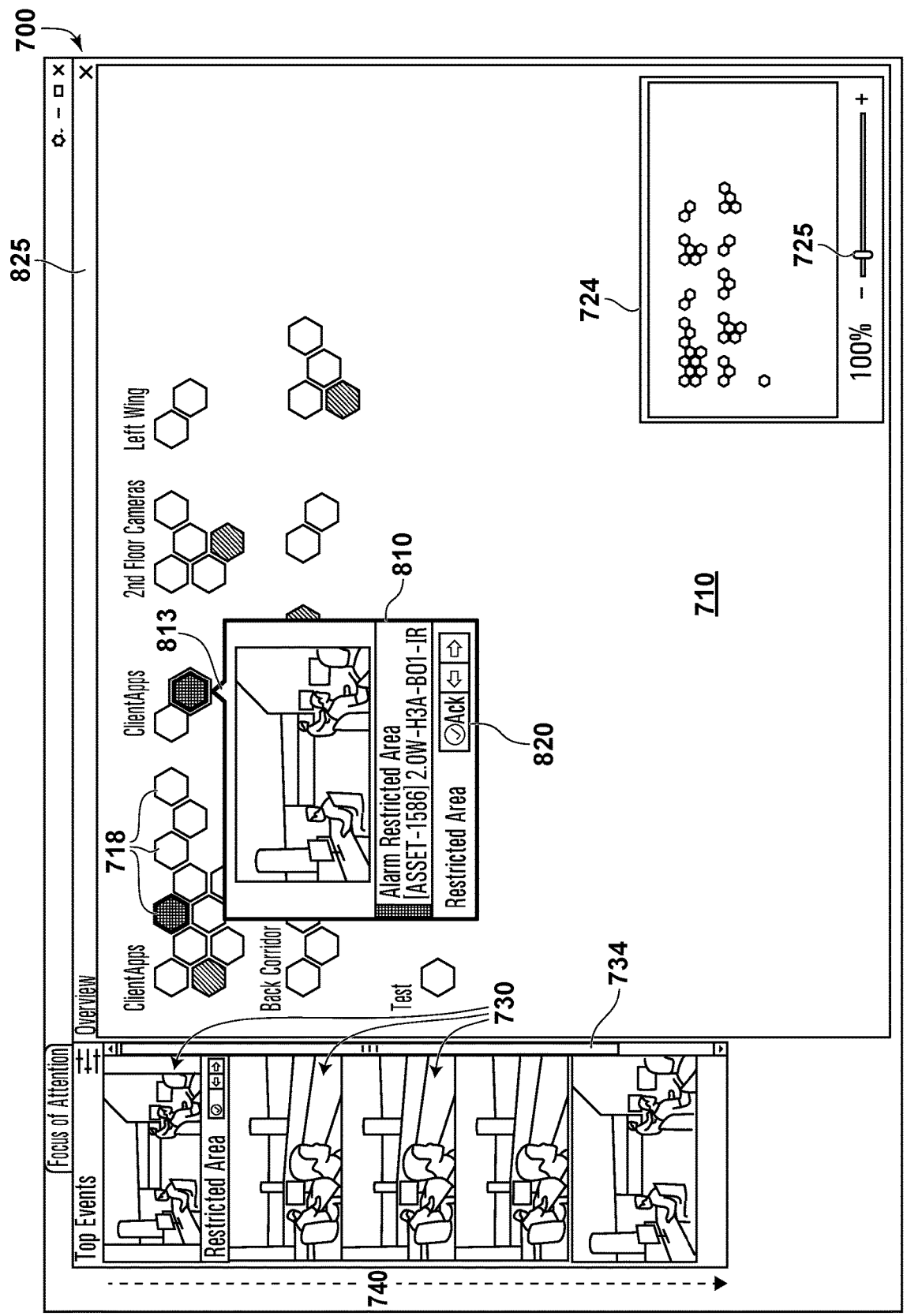
FIG. 8 illustrates the display of FIG. 7 in a different state where a video window is superimposed over an interactive map.

With reference now to both FIG. 7 and FIG. 8, it will be understood that each of the tile icons 718 can be double clicked on (or otherwise similarly selected). FIG. 8 illustrates a new state of the display 700 subsequent to double clicking on one of the tile icons 718 that corresponds to an active event. As shown, a window 810 appears on the display 700 (superimposed on the interactive map 710 within which the tile icon 718 that was double clicked on continues to be shown). Also, the illustrated window 810 includes a tail 813 which points towards the tile icon 718 that was double clicked on.

Still with reference to the window 810, included therein are a number of icons which can be single clicked on. For example, illustrated "Ack" icon 820 is an icon which can be single clicked on to acknowledge the alarm associated with active event. Once the user is done interacting with the window 810, the user can double click on a non-icon region of the window 810 to cause the window 810 to disappear from the interactive map 710.

In accordance with the illustrated example embodiment, the user can choose any suitable one of the following options when responding to an event:
  Sharing with a user ("liking" and/or "disliking" are also contemplated)
  Opening one of the windows 730 into a new tab
  Bookmarking the event
  Closing the event
  Replaying (initiating the playing of recorded video after opening a large panel for this purpose)
  Viewing Live Video (initiating the playing of live video after opening a large panel for this purpose)

In at least one example all of the above options may appear when the user hovers over one of the windows 730. Those skilled in the art will appreciate that user hover action need not be limited to hovering over the windows 730. For example, it is contemplated that a user may hover over one of the tile icons 718, and that such action may cause different options to appear.

Figure 9:
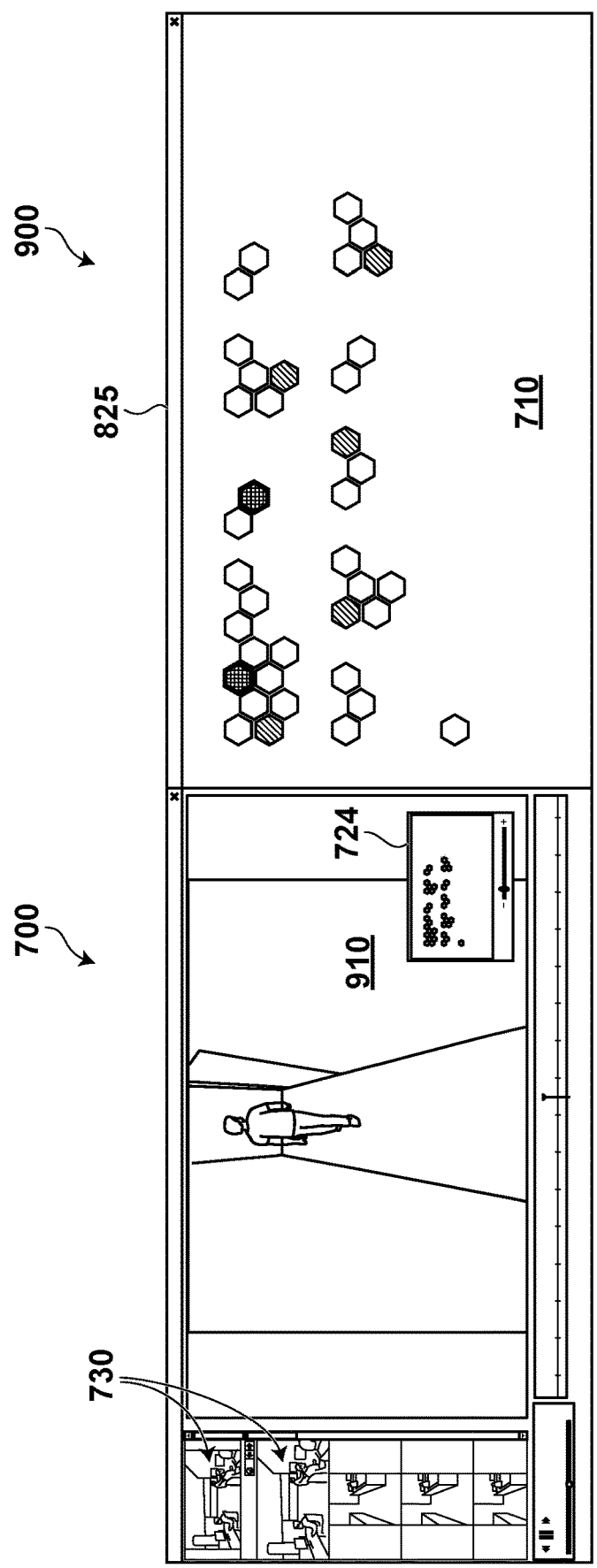
FIG. 9 illustrates the interactive map of FIG. 8 undocked and moved over to a different display screen.

In the case where the user is running the video management module 232 on a computer system with more than one display screen (for example, two or three desktop monitors) the interactive map 710 can also be undocked to move it from display on a primary display screen to display on a secondary display screen. For example, undocking can be initiated by the user clicking and holding down on edge 825 of the interactive map 710, and then dragging the interactive map 710 to the secondary display screen. FIG. 9 illustrates, following completion of this dragging operation, both the primary and secondary display screens (i.e. the display 700 and display 900). As illustrated, the space created (i.e. the space where the interactive map 710 used to be docked) is filled with a large window 910 within which video (for example, video corresponding to a most recent event) may be played. In accordance with some examples, automatic switching from one video to another may not occur even in the case where an important event becomes ready to be displayed. In the case where the large window 910 is empty (i.e. no video therein) the large window 910 may eventually become filled automatically by video corresponding to a most recent event.

It will be understood that just as the interactive map 710 can be undocked, so too can it be re-docked. In particular, re-docking can be initiated by the user clicking and holding down on the edge 825 of the interactive map 710, and then dragging the interactive map 710 back to its original location within the screen 700.

Figure 10:
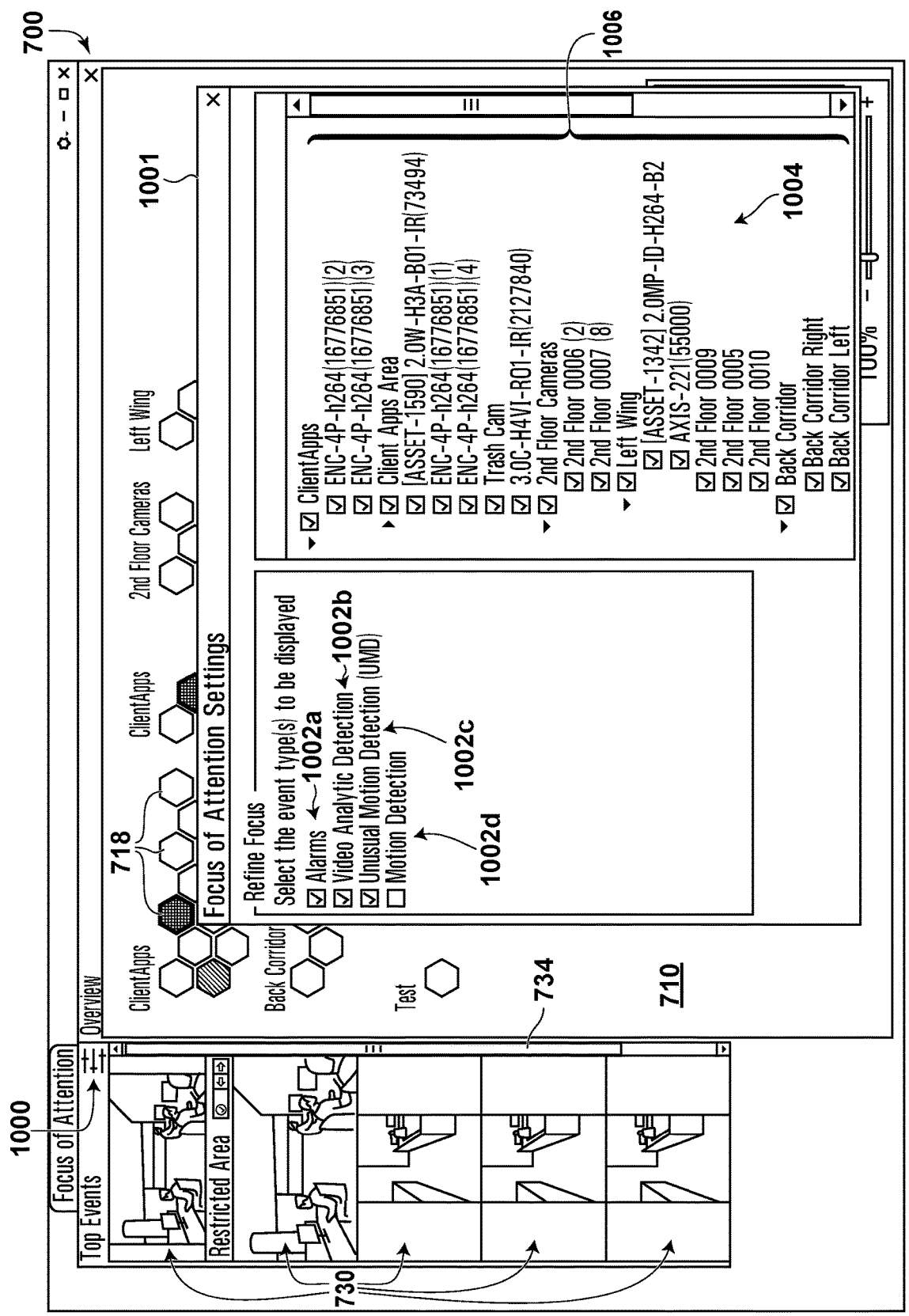
FIG. 10 illustrates the display of FIG. 7 in a different state where a dialog box is superimposed over the interactive map.

In accordance with the example embodiment illustrated in FIG. 10, a dialog box 1001 can be caused to appear by clicking on icon 1000. The dialog box 1001 is similar in appearance and function to the dialog box 600 shown in FIG. 6. Once the dialog box 1001 has appeared, user input can then be received to select only certain types of events to cause a video stream to be displayed on the display 700. The user may make this selection using any one or more of four event selectors 1002a-d, each of which in the illustrated embodiment is a checkbox: an Alarms selector 1002a, a Video Analytic Detection selector 1002b, an Unusual Motion Detection selector 1002c, and a Motion Detection selector 1002d. For example, the user could only select only Unusual Motion Detection via the Unusual Motion Detection selector 1002c, in which case only Unusual Motion events will cause a video steam to be brought forward for display. Alternatively, a user could select only Alarms, Video Analytic Detection, and Unusual Motion Detection by using their selectors 1002a-c, but not select Motion Detection, for example, in situations in which motion is common.

Likewise, the user can choose to select only certain cameras 108 in certain locations for alerts; for example the user may want to monitor the second floor, and thus cameras 108 not on the second floor would not be selected (it should be noted that this is not specifically illustrated in FIG. 10). An asset selection window 1004 includes part of the dialog box 1001 in FIG. 10. The window 1004 includes a list of selectors 1006, which in the example of FIG. 10 are checkboxes. Each of the selectors 1006 corresponds to one or more different assets, examples of which may include cameras 108, the storage module 240, or other sources of video streams.

In another embodiment, the Video Analytic Detection selector 1002b may be further subdivided. For example, the Video Analytic Detection selector 1002b may comprise a drop-down list of specific and selectable video analytic events (not shown in FIG. 10). So for example, by selecting only certain of those events, the user may cause video streams to appear on display 700 only in response to the system 100 having detected those events. For example, only "object removed" analytics may be selected in order to monitor an area for theft, in which case other video analytic events are not brought forward and displayed.

Additionally or alternatively, in another example embodiment the dialog box 1001 may comprise another selector (not shown in FIG. 10) that subdivides the Video Analytic priority level by type of video analytic. For example, the selector may expose a drop-down list of different types of video analytics of which at least some have different priority levels. For example, a "tripwire" event may be granted a higher priority than an "object left behind" event.

As mentioned previously, the icon 1000 is provided for making the dialog box 1001 appear within a region of the display 700. Additionally, the dialog box 1001 may be caused to appear in other manners. For example, the dialog box 1001 may be caused to automatically appear at an initial point in time when the application program is launched.

In accordance with some example embodiments, the video capture and playback system 100 may include an event filter implemented by one of the modules 200 such as, for example, the event management module 265 (FIG. 2). The event filter may allow the event management module 265 to reject excessively frequent events in order to prevent such events from undermining effective video surveillance display. In terms of excessively frequent events, take the example where one or more of the video capture devices 108 (FIG. 1) are too noisy, producing an excessive number of events of minimal importance, which would be expected to unnecessarily distract the VMS user. In such a scenario, the event filter may operate to limit the rate at which such video capture device 108 can send events to the user interface provided by the video playback module 264 (FIG. 2). Moreover, the rate-limiting action of the event filter can be local in time, insofar as it is the arrival rate of the most recent events that can determine whether subsequent events will be rejected or accepted. Also, in accordance with at least some examples, the arrival rates of events occurring in the distant past, where "distant" is relative to filter parameters, do not influence the filter's decision to accept or reject present events.

In accordance with at least some examples, the event filter takes arrival times of events (from each detection device such as, for instance, a camera or access control device) as input. For each arrival time a true/false judgement may be generated as to whether or not the event should be accepted. In accordance with a number of examples, the rate filter: i) has two parameters: a filter threshold and a characteristic rate; and ii) stores two state elements: the time of the last arrival and the value of the filter. Roughly speaking, it will be understood that when a new event arrives at the event filter, the filter combines the difference between the last and the current arrival times with the characteristic rate and attempts to update the value. If the value exceeds the filter threshold, the event is rejected. If not, the event is accepted.

Figure 11:
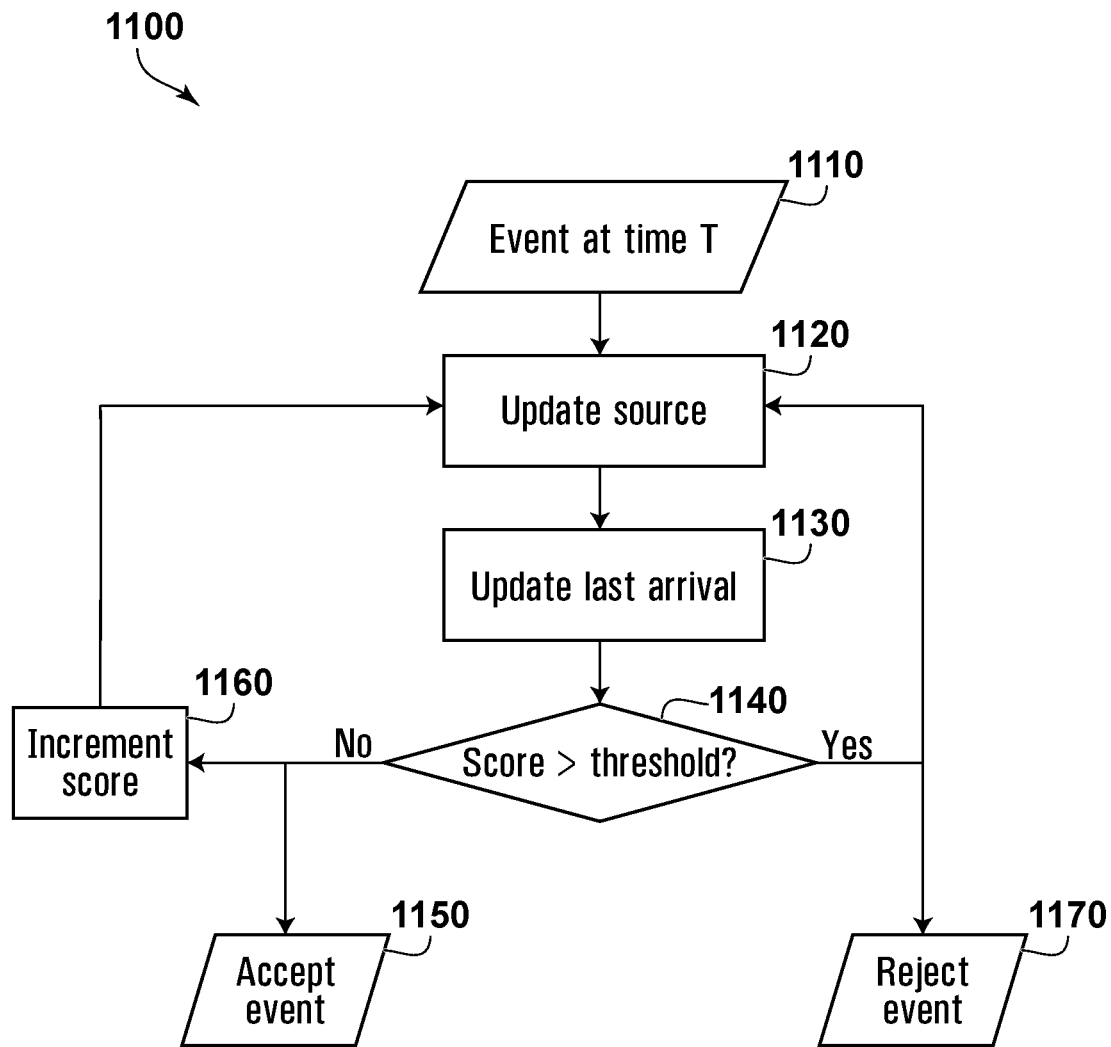
FIG. 11 illustrates a flow diagram of a method of operating an event filter in accordance with an example embodiment.

FIG. 11 illustrates a flow diagram of a method 1100 of operating an event filter in accordance with an example embodiment. At block 1110, the event filter receives a current timestamp (time T) as input. Next, at block 1120, the event filter updates a score variable based on the received timestamp input by multiplying the value of the score variable by a factor based on the "delta" or difference between the value of the current timestamp and the timestamp of the most recent previously-received event. This factor is between zero and one, and is a decreasing function of the delta. Next, at block 1130, the event filter updates a "Last Arrival" (or "prev_time") variable by replacing the old value (corresponding to the previously received timestamp) with the new value (corresponding to the current timestamp). At block 1140, the event filter makes a determination of whether the value of the score variable is greater than some predetermined threshold. If "No", then the event that occurred at time T is accepted (block 1150) and the event filter increments the score. Alternatively if the determination is "Yes", then the event that occurred at time T is rejected (block 1170). Those skilled in the art will appreciate that the blocks 1140 to 1170 can be implemented using suitable source code that includes an if-then-else statement (corresponding to the block 1140) by which follow conditional execution of one or more other statements (corresponding to one or more of the block 1150 to 1170).

An example listing for a suitable algorithm for the event filter is shown in FIG. 12. The update factor is specified in FIG. 12 as follows:

$$\exp(-\lambda \delta t)$$

Where $\Delta$ is the characteristic rate (a parameter chosen when designing the system) and $\delta t$ is the timestamp of the current event minus the timestamp of the most recent previous event.

In accordance with some examples, each event filter can be specific to not only the respective individual detection device, but also a specific type of event such as, for instance, motion, unusual motion, virtual tripwire, etc. Since event filters can consume a relatively tiny amount of storage, having a large number of event filters may not pose an issue.

In accordance with FIG. 12, the mathematical formula for the acceptance rate is as follows:

$$\text{acceptance rate} = \frac{1}{\sqrt{1 + a^2}}$$

where $$a = \frac{\text{event rate}}{\text{characteristic rate} \times \text{effective threshold}}.$$

Effective threshold may be a complex function of the filter threshold, but if $1.0 \leq$ filter threshold $\leq 2.5$ then effective threshold filter threshold+0.3.

When the event rate gives $a > 1$ then the event filter tends to reject events, and when the event rate gives $a < 1$ then the event filter tends to accept events. At the time of a first ever received event, the acceptance rate will be 1 and event rejection is mathematically impossible. At other later times the acceptance rate will greater than 1, and event rejection has at least some mathematical chance of occurring. It will be understood that selection of the filter threshold and characteristic rate determines to what extent a given event rate will count as "too fast". Furthermore, the notion of "too fast" can be chosen differently for each type of event.

In at least one example, the event management module 265 is alternatively configured to automatically select appropriate rate filter parameters based on user feedback.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method comprising:
   detecting multiple events;
   assigning respective event priority levels to the detected events;
   displaying a plurality of video streams on a display,
   wherein the display comprises a plurality of display windows which define an ordered sequence of display windows, and
   wherein each respective video stream on the display is associated with a respective one of the detected events and is associated with a corresponding event priority level of a respective detected event, and
   wherein the displaying comprises:
      displaying, in a first one of the display windows, a first one of the video streams, the first one of the display windows comprises a primary display window; and
      displaying other ones of the video streams in respective ones of the display windows, the respective ones of the display windows of the display windows comprises secondary display windows,
      wherein each other one of the video streams is associated with an event priority level that is lower than the event priority level of the first one of the video streams;
   detecting a first further event and assigning a respective event priority level to the first further event; and
   in response to the respective event priority level being higher than or equal to an associated event priority level of the video stream displayed in the primary display window:
      shifting the display of one or more of the video streams to the next one or more display windows in the ordered sequence of display windows; and
      displaying a new video stream in a first available display window in the ordered sequence of display windows,
      wherein the new video stream is associated with the detected first further event, and
      wherein the first available display window comprises the primary display window,
      wherein the priority level associated with the first one of the video streams is an alarm, and wherein the shifting of the display of the first one of the video stream is prevented until the alarm is acknowledged via user input.

2. The method of claim 1, further comprising, in response to detecting the first further event, ceasing display of the video stream in the last display window in the ordered sequence of display windows.

3. The method of claim 1, further comprising preventing a displayed video stream from shifting to the next display window in the ordered sequence of display windows.

4. The method of claim 1, wherein event priority levels are ranked from highest to lowest according to the following event priority levels: alarm, unusual motion, analytics, and usual motion.

5. The method of claim 1, wherein a video stream associated with a more recent event is associated with a higher event priority level than a video stream associated with a less recent event.

6. The method of claim 1, further comprising, in response to user input, ceasing display of a video stream.

7. The method of claim 6, further comprising, in response to ceasing display of the video stream, adding to an event log an indication of the event associated with the video stream.

8. The method of claim 7, further comprising re-initiating display of the video stream in response to a user input being received in connection with the indication.

9. The method of claim 1, further comprising, in response to user input, shifting the display of a video stream to another display window.

10. The method of claim 1, further comprising, in response to user input, transmitting a selected video stream to a remote device.

11. The method of claim 1, wherein a detected event comprises one or more of: an alarm being triggered, unusual motion of an object, an object being identified or classified, and usual motion of an object.

12. The method of claim 1, further comprising:
   determining one or more patterns associated with user-selected ceasing of the display of video streams; and
   preventing the display of further video streams based on the one or more patterns.

13. The method of claim 12, wherein the one or more patterns are determined using a machine learning module.

14. The method of claim 1, further comprising:
   determining one or more patterns associated with user-selected preventing of shifting of the display of video streams; and
   escalating the event priority levels associated with further video streams based on the one or more patterns.

15. The method of claim 1, further comprising:
   detecting with a camera a second further event, wherein the second further event is associated with an event priority level;
   determining that a displayed video stream is associated with the same event priority level as the detected second further event, and that the displayed video stream was obtained using the camera; and
   preventing a video stream comprising the second further event from being displayed on the display.

16. The method of claim 15, wherein the preventing comprises preventing a video stream comprising the second further event from being displayed on the display if a user-defined period of time has not elapsed since the displayed video stream was displayed on the display.

17. The method of claim 1, wherein the display windows are positioned along one or more edges of the display.

18. The method of claim 1, further comprising:
determining that an object in a video stream is the same as another object in another video stream; and
in response thereto, displaying the video stream in the primary display window of the display windows.

19. The method of claim 18, wherein the ordered sequence starts at the primary display window, proceeds to one of the other display windows, and further proceeds to a next nearest of the other display windows.

20. The method of claim 1, wherein the primary display window is reserved for the video streams that comprise: a most recently detected event; or events determined to be of a relatively higher event priority level than respective events currently comprised in the video streams displayed in the secondary display windows.

21. The method of claim 1, further comprising:
in response to the respective event priority level being lower than the associated event priority level associated with the first one of the video stream displayed in the primary display window:
maintaining the first one of the video streams displayed in the primary display window;
shifting the display of one or more of the video streams in the secondary display windows to the next one or more display windows in the ordered sequence of display windows; and
displaying the new video stream in a first available secondary display window in the ordered sequence of display windows.

22. A system comprising:
one or more cameras; and
one or more processors communicative with memory having stored thereon computer program code configured when executed by the one or more processors to cause the one or more processors to perform a method comprising:
detecting multiple events;
assigning respective event priority levels to the detected events;
displaying, using the one or more cameras, a plurality of video streams on a display,
wherein the display comprises a plurality of display windows which define an ordered sequence of display windows, and
wherein each respective video stream one the display is associated with a respective one of the detected events and is associated with a corresponding event priority level of a respective detected event, and
wherein the displaying comprises:
displaying, in a first one of the display windows, a first one of the video streams, the first one of the display windows comprising a primary display window; and
displaying other ones of the video streams in respective ones of the display windows, the respective ones of the display windows comprising secondary display windows,
wherein each other one of the video streams is associated with an event priority level that is lower than the event priority level of the first one of the video streams;
detecting a first further event and assigning a respective event priority level to the first further event; and
in response the respective event priority level being higher than or equal to an associated event priority level of the video stream displayed in the primary display window:
shifting the display of one or more of the video streams to the next one or more display windows in the ordered sequence of display windows; and
displaying, using the one or more cameras, a new video stream in a first available display window in the ordered sequence of display windows,
wherein the new video stream is associated with the detected first further event, and
wherein the first available display window comprises the primary display window,
wherein the event priority level associated with the first one of the video streams is an alarm, and
wherein the shifting of the display of the first one of the video streams is prevented until the alarm is acknowledged via user input.

23. A computer-readable medium having stored thereon computer program code configured when executed by one or more processors to cause the one or more processors to perform a method comprising:
detecting multiple events;
assigning respective event priority levels to the detected events;
displaying a plurality of video streams on a display,
wherein the display comprises at least one primary display window and multiple secondary display windows smaller than the primary display window,
wherein the primary and secondary display windows define an ordered sequence of display windows,
wherein each respective video stream on the display is associated with a respective one of the detected events and is associated with a corresponding event priority level of a respective detected event, and wherein the displaying comprises:
displaying in the primary display window a first one of the video streams; and
displaying other ones of the video streams in respective ones of the secondary display windows,
wherein each other one of the video streams is associated with an event priority level that is lower than the event priority level of the first one of the video streams;
detecting with the one or more cameras a first further event; and
in response to the respective event priority level being higher than or equal to an associated event priority level of the video stream displayed in the primary display window:
shifting the display of one or more of the video streams to the next one or more secondary display windows in the ordered sequence of display windows; and
displaying a new video stream in a first available display window in the ordered sequence of display windows,
wherein the new video stream is associated with the detected first further event, and
wherein the first available display window comprises the primary display window,
wherein the event priority level associated with the first one of the video streams is an alarm, and wherein the shifting of the display of the first one of the video streams is prevented until the alarm is acknowledged via user input.

24. A method comprising:
displaying a plurality of video streams on a display,
wherein the display comprises a plurality of display windows which define an ordered sequence of display windows, and wherein each respective video stream is associated: with a respective event; and corresponding event priority level of the respective event, and wherein the displaying comprises:

displaying, in a first one of the display windows, a first one of the video streams, the first one of the display windows comprising a primary display window;

displaying other ones of the video streams in respective ones of the display windows, the respective ones of the display windows comprising secondary display windows, wherein each other one of the video streams is associated with an event priority level that is lower than the event priority level of the first one of the video streams;

shifting the display of one or more of the video streams to the next one or more display windows in the ordered sequence of display windows; and displaying a new video stream in a first available display window in the ordered sequence of display windows, wherein the new video stream is associated with: a further event; and a respective event priority level of the further event, and wherein the first available display window comprises the primary display window, wherein the event priority level associated with the first one of the video streams is an alarm, and wherein the shifting of the display of the first one of the video streams is prevented until the alarm is acknowledged via user input.

\* \* \* \* \*